(12) United States Patent
Mesa-Arias

(10) Patent No.: US 11,350,638 B1  
(45) Date of Patent: Jun. 7, 2022

(54) MEAT SHREDDER FOR EMPANADA MEATS AND OTHER DISHES

(71) Applicant: Emma E. Mesa-Arias, Manizalez (CO)

(72) Inventor: Emma E. Mesa-Arias, Manizalez (CO)

( * ) Notice: Subject to any disclaimer, the term of this patent is extended or adjusted under 35 U.S.C. 154(b) by 309 days.

(21) Appl. No.: 16/850,635

(22) Filed: Apr. 16, 2020

Related U.S. Application Data

(63) Continuation-in-part of application No. 15/830,129, filed on Dec. 4, 2017, now abandoned.

(51) Int. Cl.
| | |
|---|---|
| *B02C 25/00* | (2006.01) |
| *A22C 17/00* | (2006.01) |
| *B02C 4/30* | (2006.01) |
| *B02C 4/14* | (2006.01) |
| *B02C 18/14* | (2006.01) |

(52) U.S. Cl.  
CPC ............ *A22C 17/0026* (2013.01); *B02C 4/14* (2013.01); *B02C 4/30* (2013.01); *B02C 18/145* (2013.01); *B02C 25/00* (2013.01)

(58) Field of Classification Search  
CPC ....... B02C 25/00; B02C 18/145; B02C 18/30; B02C 18/301  
See application file for complete search history.

(56) References Cited

U.S. PATENT DOCUMENTS

| | | | | |
|---|---|---|---|---|
| 4,773,600 | A * | 9/1988 | Metski | B02C 18/145 241/101.76 |
| 7,607,600 | B2 * | 10/2009 | Salgado | B02C 18/16 241/199.12 |
| 9,775,360 | B2 * | 10/2017 | Voyatzakis | B02C 18/2291 |
| 10,791,748 | B2 * | 10/2020 | De Los Santos Gualque | B02C 18/24 |
| 11,224,230 | B2 * | 1/2022 | Cameron | B02C 13/282 |
| 2009/0072058 | A1 * | 3/2009 | Salgado | B02C 18/16 241/82.5 |
| 2021/0101155 | A1 * | 4/2021 | Astwood | A22C 17/0026 |

* cited by examiner

*Primary Examiner* — Faye Francis  
(74) *Attorney, Agent, or Firm* — Luis Figarella

(57) ABSTRACT

A machine for manual action that releases, shreds or defrays the different fibers of meat for human consumption, be it chicken, beef, pork or any other suitable animals that have fibers. These are characterized by having a bar of different shapes located on the periphery of a shaft which has a handle for manual action so that when the operator turns the handle, bars that are located linearly and equidistant on an axis rotate so that the meat pieces located in the tray enter through an opening and collide between the bars inside the casing. The rotating and fixed bars swivel between said bars and rods, allowing the bars to rotate without colliding or crossing. Through this movement, the pieces of meat are shredded or defrayed in different sizes, depending on the distance and speed between the linear bars moving and those that are fixed. Note the system may also work with either reduction gears and or a reduction motor. This shredder may be attached to the table via a vise or similar mechanism.

3 Claims, 11 Drawing Sheets

MEAT SHREDDER FOR EMPANADA MEATS AND OTHER DISHES

CROSS-REFERENCE TO RELATED APPLICATIONS

This application is a Continuation in part of co-pending U.S. Non-Provisional patent application Ser. No. 15/830,129 titled "Manual meat shredder for empanada meats and others", filed on Dec. 4, 2017 the disclosure of which is herein incorporated by reference in its entirety.

PATENTS CITED

The following documents and references are incorporated by reference in their entirety, Bustos (PCT/MX2002/000108).

FIELD OF THE INVENTION

The principal object of the invention is the creation of a manual meat shredder is to allow the shredding through a manually operated lever/handle or through the use of a reduction gear motor in an easy and quick way.

Other Objective of the invention is to save time, reduce the exposure to contaminant as well as to increase meat quality.

An important objective is that the thickness of the shredded beef may be adjusted as a function of the distance between the lines of bars located linearly and in the periphery of the axle carrying said bars.

A further objective is to allow the aseptic handling of the meat, as the operator need not touch the meat, and as the product is manufactured in stainless steel.

DESCRIPTION OF THE RELATED ART

This invention is about the Processing of Meat, specifically of the shredding of meats, such as beef, pork, etc., used for the preparation of food products that contain shredded beef, such as empanadas, burritos, pasta, pizza and other culinary dishes. The process is generally accomplished through manual means, or as shown in patent application PCT/MX2002/000108 as used in the preparation of food products that contain shredded meats in empanadas, patties, pastries, burritos, pizza and other such delicacies. The invention's sector is metal and mechanical, for the shredding of chicken, beef or pork using a either a manually operated machine, or one with a reduction motor.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

In one aspect the invention is about an apparatus for shredding meat consisting of a horizontal rotating central cylinder supported at both ends by a mechanical housing, with at least one shaft connected to at least one end of said central cylinder, said shaft protruding to said mechanical housing's exterior, wherein said mechanical housing has at least one each of a top and bottom opening, said central cylinder having one or more rows of rotating bars affixed along said central cylinder's surface, and said mechanical housing having one or more rows of fixed bars affixed along one or more of said mechanical housing's sides, wherein said fixed bars interspersed with said rotating bars so when they are located along the same plane a gap exists between said fixed bars and said rotating bars, wherein said rotating bars and said fixed bars may have a circular, triangular, rectangular or any other geometric cross section, a rotation motor and gears mechanically connected to said shaft, electrical control components for said motor and a hopper forming a funnel to the shredding area, said hoper having one or more removable safety covers with an opening diameter smaller than 8 cm, with at least one said safety cover having an have one or more safety cover surfaces, including a top one that may be opened to reach the interior of said hopper. In another aspect said electrical control components include an On/Off switch and an emergency stop button. In yet another aspect, the rotating bars and said fixed bars are replaceable.

Other features and advantages of the present invention will become apparent upon examining the following detailed description of an embodiment thereof, taken in conjunction with the attached drawings.

Figure 1:
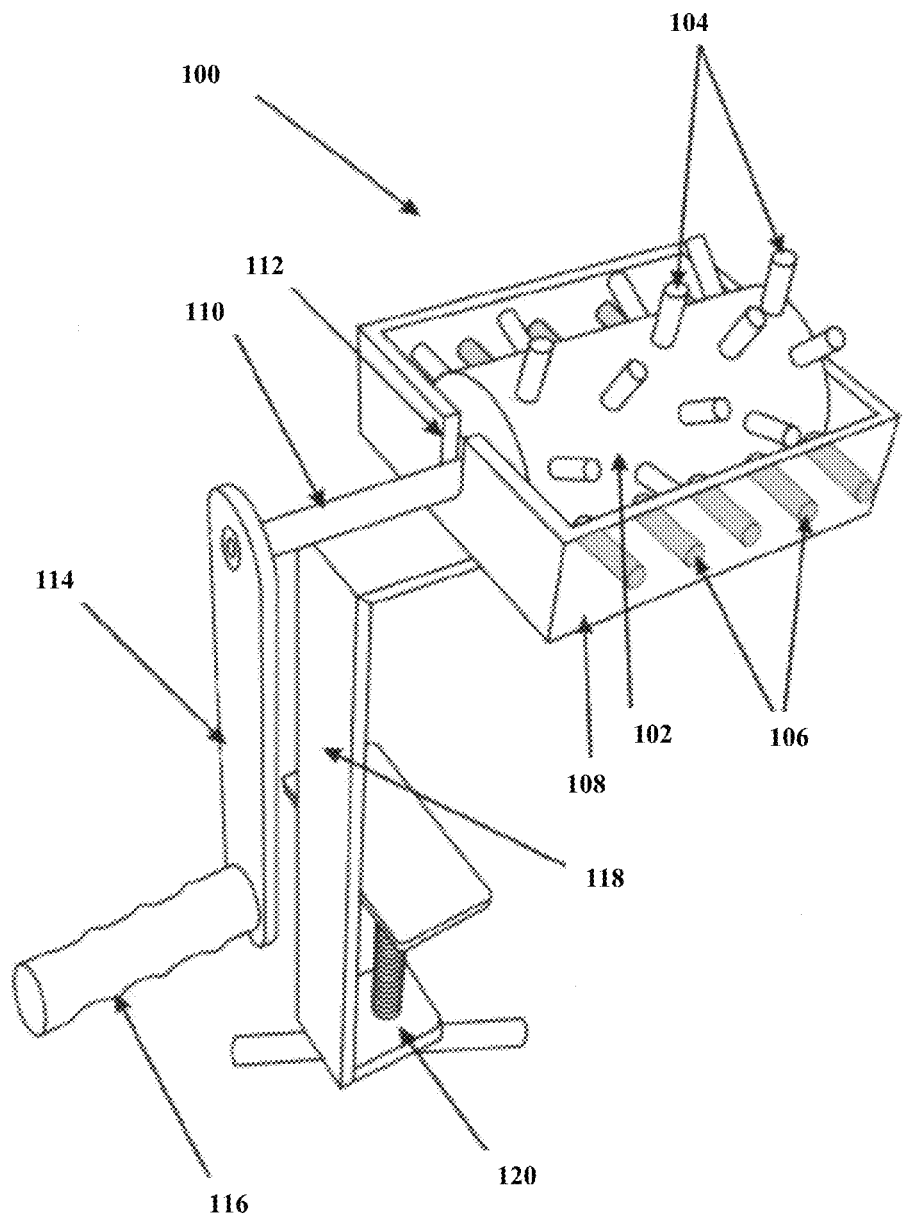
FIG. 1 shows a perspective top view of the manual machine and crank, according to an exemplary embodiment of the invention.

The above-described and other features will be appreciated and understood by those skilled in the art from the following detailed description, drawings, and appended claims.

DETAILED DESCRIPTION OF THE PREFERRED EMBODIMENT

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

Simplifications or omissions may be made to avoid obscuring the purpose of the section. Such simplifications or omissions are not intended to limit the scope of the present invention. All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

As used in the specification and claims, the singular forms "a", "an" and "the" include plural references unless the context clearly dictates otherwise. For example, the term "a transaction" may include a plurality of transaction unless the context clearly dictates otherwise. As used in the specification and claims, singular names or types referenced include variations within the family of said name unless the context clearly dictates otherwise.

Certain terminology is used in the following description for convenience only and is not limiting. The words "lower," "upper," "bottom," "top," "front," "back," "left," "right" and "sides" designate directions in the drawings to which reference is made, but are not limiting with respect to the orientation in which the modules or any assembly of them may be used.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Referring to FIGS. 1-8 we see where the present invention is about a manual machine which loosens/releases (shredding or 'desmechando') the fibers in the various meats for human consumption, be they chicken, beef or pork. This manual beef shredding unit (view 100) is operated through manual action and is characterized for the ability to shred/ 'desmechar' the various fibers of the meat consumed by humans, being designed to have good performance in the shredding of beef or chicken, having a main purpose of saving time, reduce exposure to contaminants and attain quality.

The machine is characterized by having bars (both attached to a rotating member 102 and to the fixed housing 112 with potential different shapes; circular/cylindrical bars, triangular bars or square bars located in the periphery of a central component 102 placed on a central axis so each bar line formed along the periphery of the said central axis may have two, three, four, five, six, seven or eight bars 104 that pass near the fixed bars 106 as the central component 102 rotates through the action of a lever/handle 114/116 actuated by the operator's arm/hand, who grabs the handle 116 which transmits the force through the lever 116 to the central rod 110 connecting the lever connected to the rotating component 102 which supports the housing/chassis 108 between the slots 112.

This central component 102 is placed along the central axis whose shaft 110 rotates the Bars 104, 106 pass each other. The bars 104 are located equidistant and in a row with the area of rotation and are further interspaced with the permanently fixed (i.e. Affixed) bars 106 and further may also be of different shapes; as bars with circular (cylindrical), triangular or square cross sections and equidistant to the rotating bars 104 so that they cross the fixed bars 106, effecting tearing and/or shredding of the meat 304 within the tray 302 placed around the hopper 306.

The meat may be manually fed through the upper part of the hopper 306 (or through the openings 802/804) where it is shredded/torn. As the meat pieces 304 are processed by contacting rotating bars 104 against the fixed bars 106 within the housing/chassis 108 the product coarseness is controlled by the different thickness of said bars 104/106, which depends on the adjustable and parallel space/distance between the rotating bars 104 and the affixed ones 106. The central component 102 axis is anchored to the housing 108 through screws 704.

Figure 2:
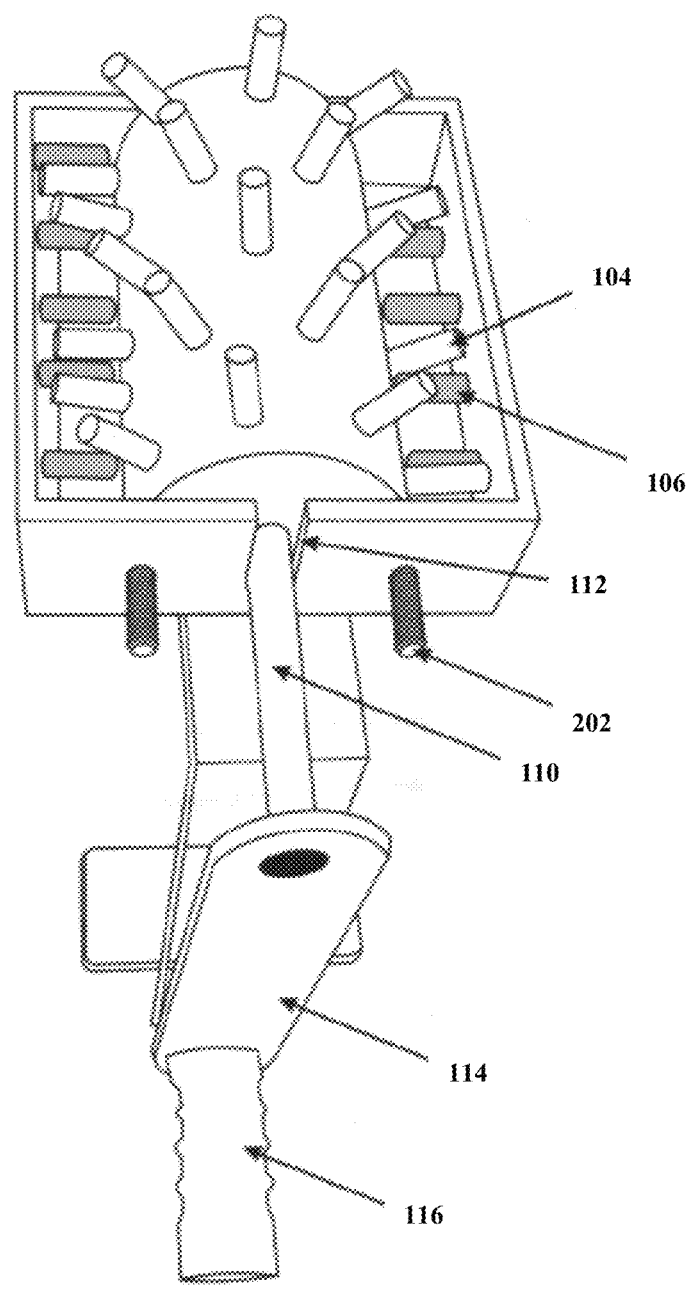
FIG. 2 shows a perspective top view of the manual machine and crank, according to an exemplary embodiment of the invention.

Referring to FIG. 1 we see the manual meat shredder 102, having a rotating bar 104 carrier 102 having circular shaped rotating bars 104 and fixed location bars 106 also having a circular cross section, mounted on a rotating component 102, which is supported over the housing/chassis 108 slots 112 and actuated by the handle 116 connected to the arm/lever/crank 114 through shaft 110. In FIG. 2 we show the manual meat shredder 100 shaft 110 connecting the rotating bar 104 carrier 102, having circular shaped rotating bars 104 showing them rotating without making contact with affixed bars 106, said affixed bars being attached to the chassis/housing 108, the housing slot 112 supporting the shaft 6 in turn supporting the rotating bar carrier 102 whose rotation is caused by the rotation of the handle 116 connected to the rod/lever 114. In addition, it shows the studs 202 which connect it to the hopper 306.

Figure 3:
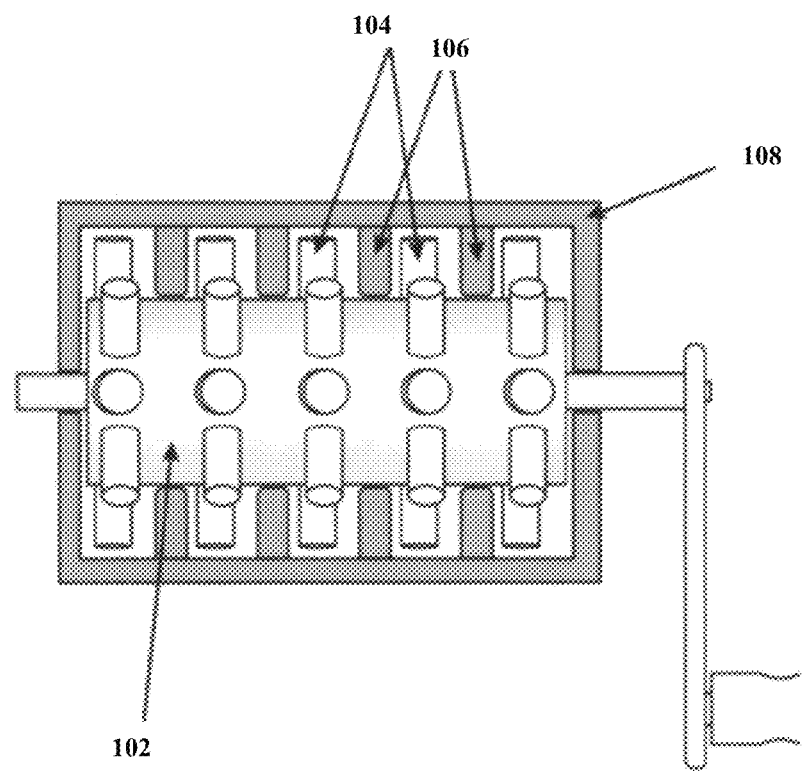
FIG. 3 shows a Top view of the manual machine and crank, according to an exemplary embodiment of the invention.
Figure 4:
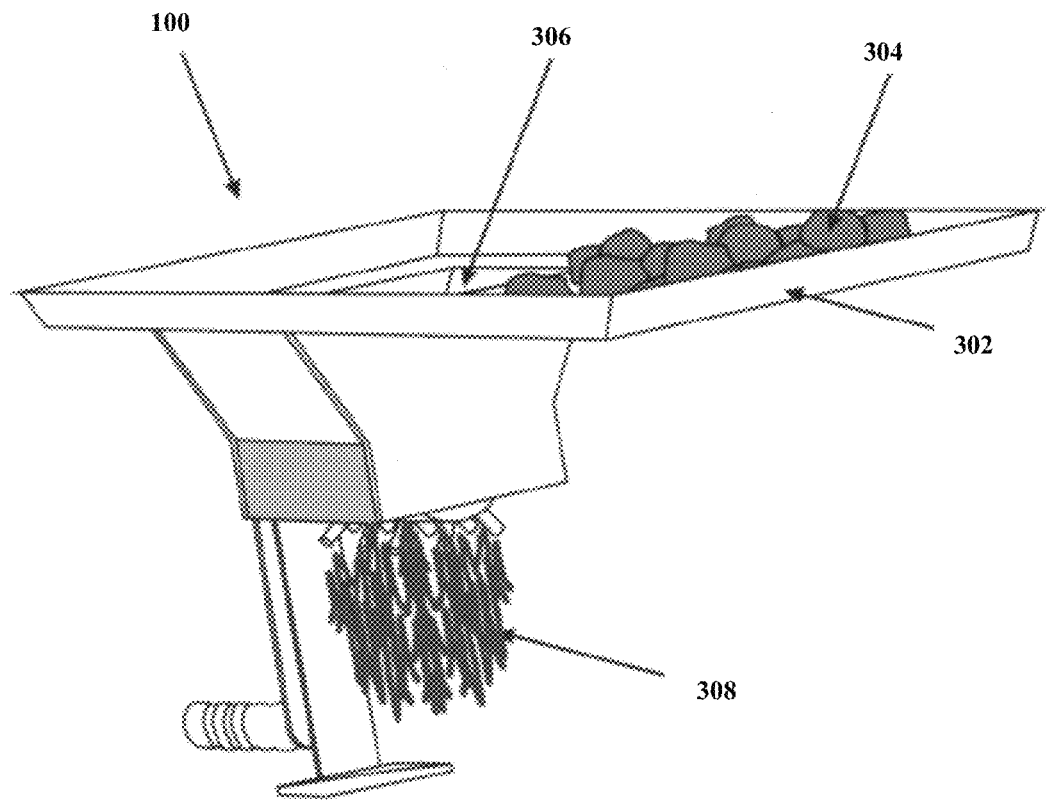
FIG. 4 shows a perspective side view of the manual machine with a tray and meat, according to an exemplary embodiment of the invention.

Referring to FIGS. 3-4 they show the manual meat shredder 100 overlap between the rotating bars 104 mounted on the rotating bar carrier 102 and the housing 108 mounted fixed bars 106 which allows for the contactless rotation between bars, and for the gap between said bars to shred the meat chunks 304. The manual meat shredder 102, tray 302 with pieces of meat 304 to be fed into the mouth/entry of the hopper 306.

Figure 5:
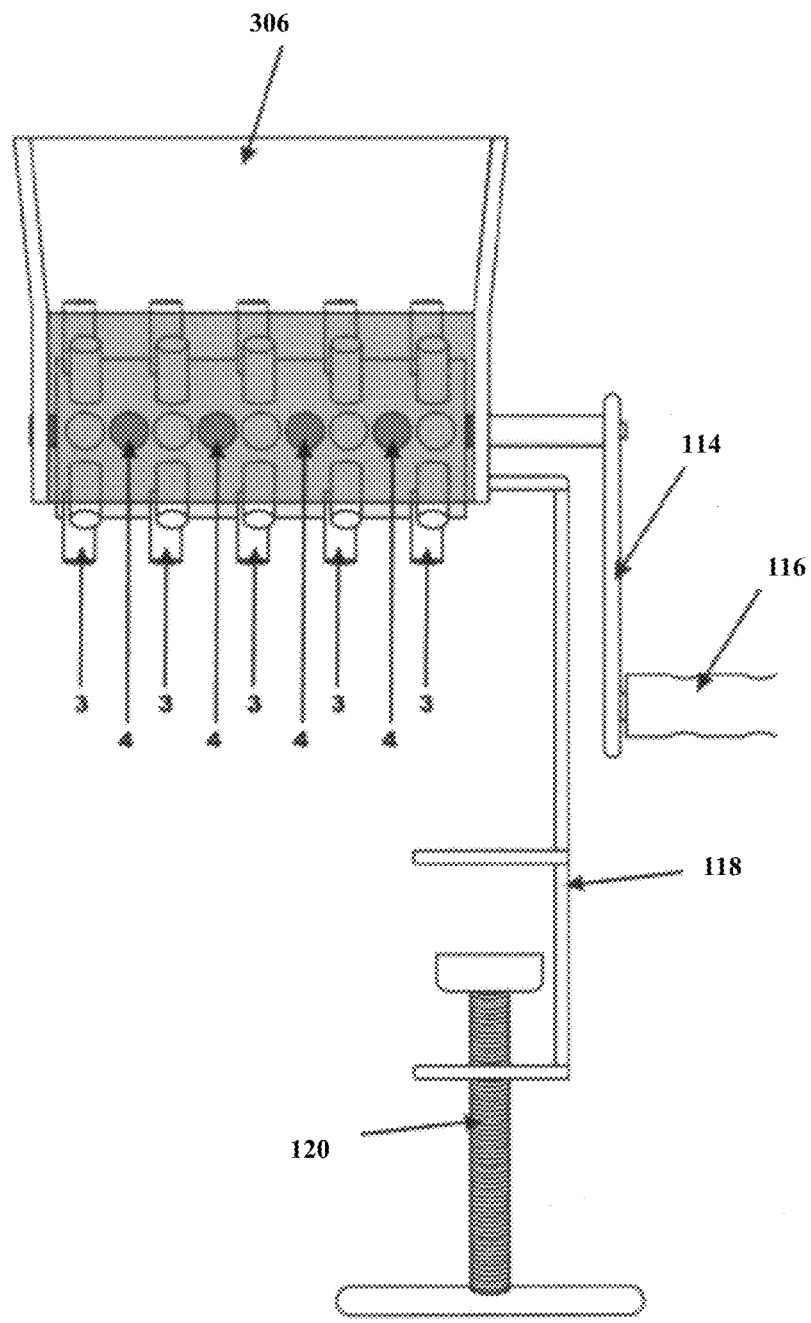
FIG. 5 shows a front view of the manual machine and crank, according to an exemplary embodiment of the invention.
Figure 6:
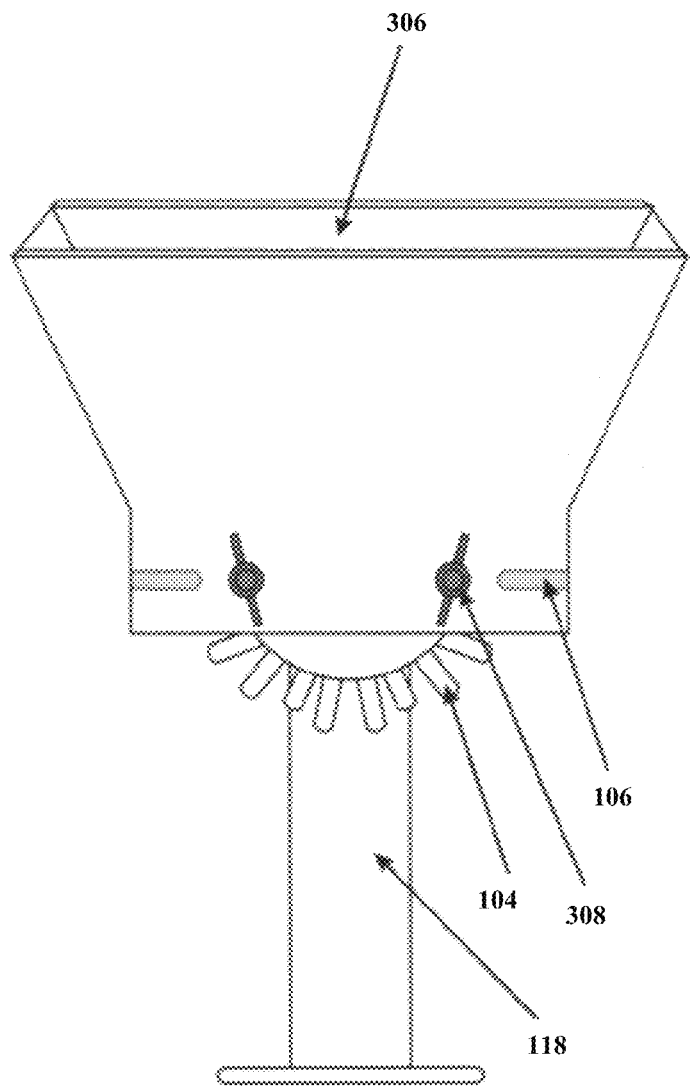
FIG. 6 shows a side view of the manual machine having a meat input housing mounted, according to an exemplary embodiment of the invention.
Figure 7:
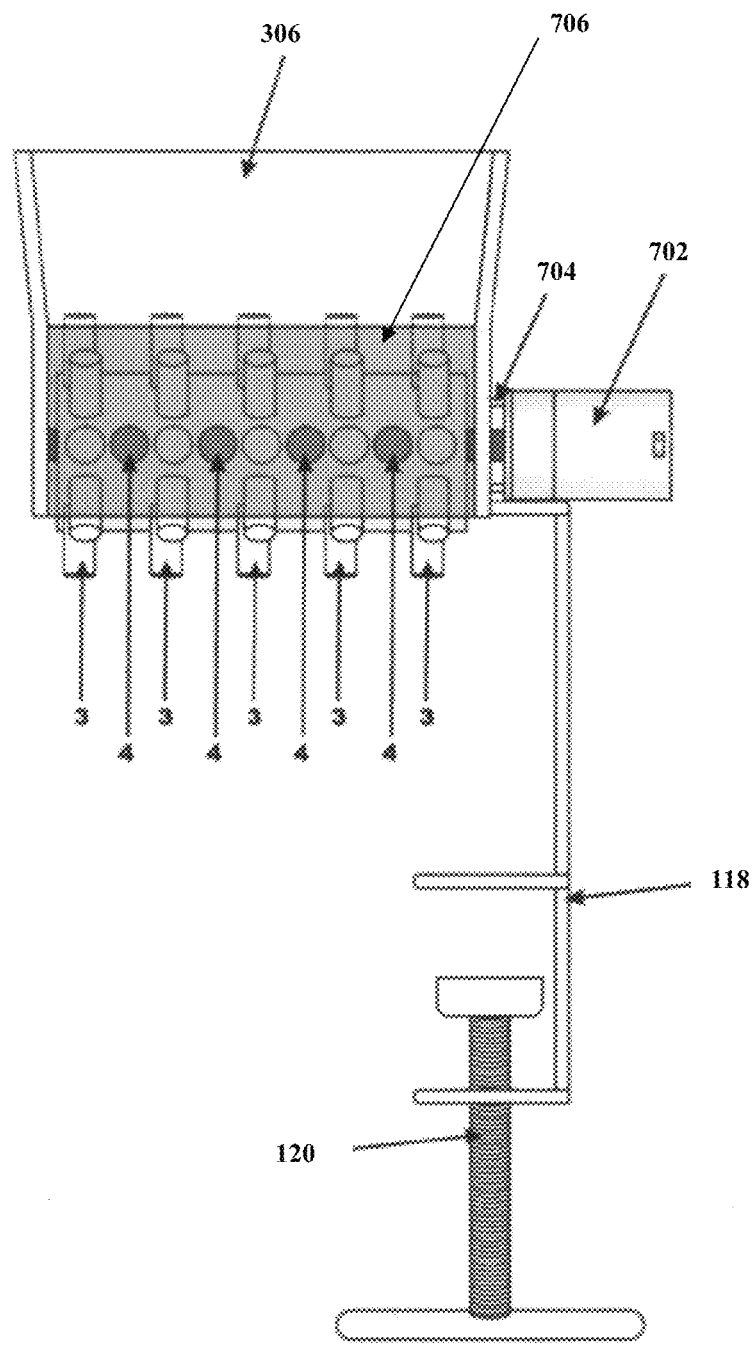
FIG. 7 shows a side view of the machine powered by a reduction motor, according to an exemplary embodiment of the invention.
Figure 8:
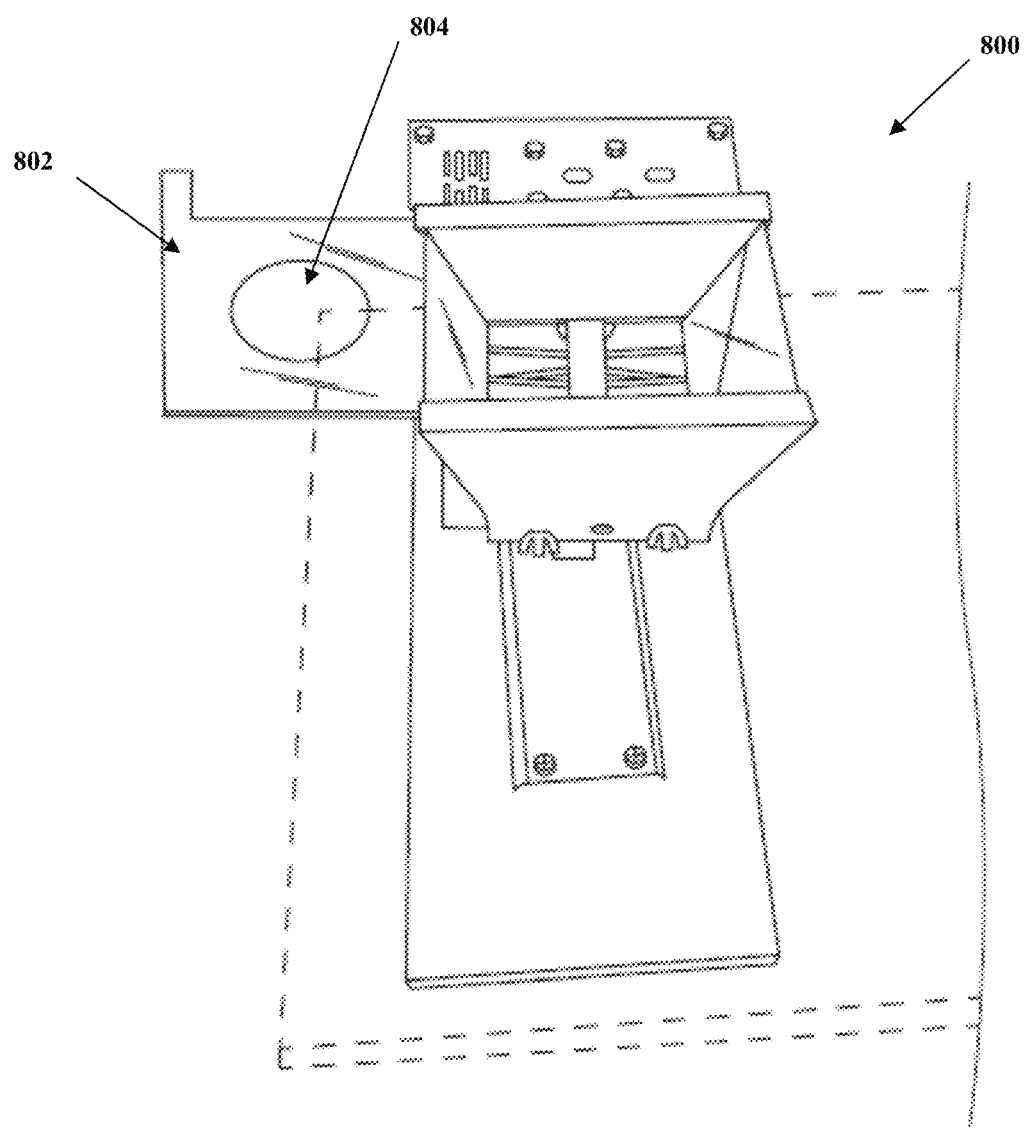
FIG. 8 shows a top isometric view of the hand guard assembly, according to an exemplary embodiment of the invention.
Figure 9:
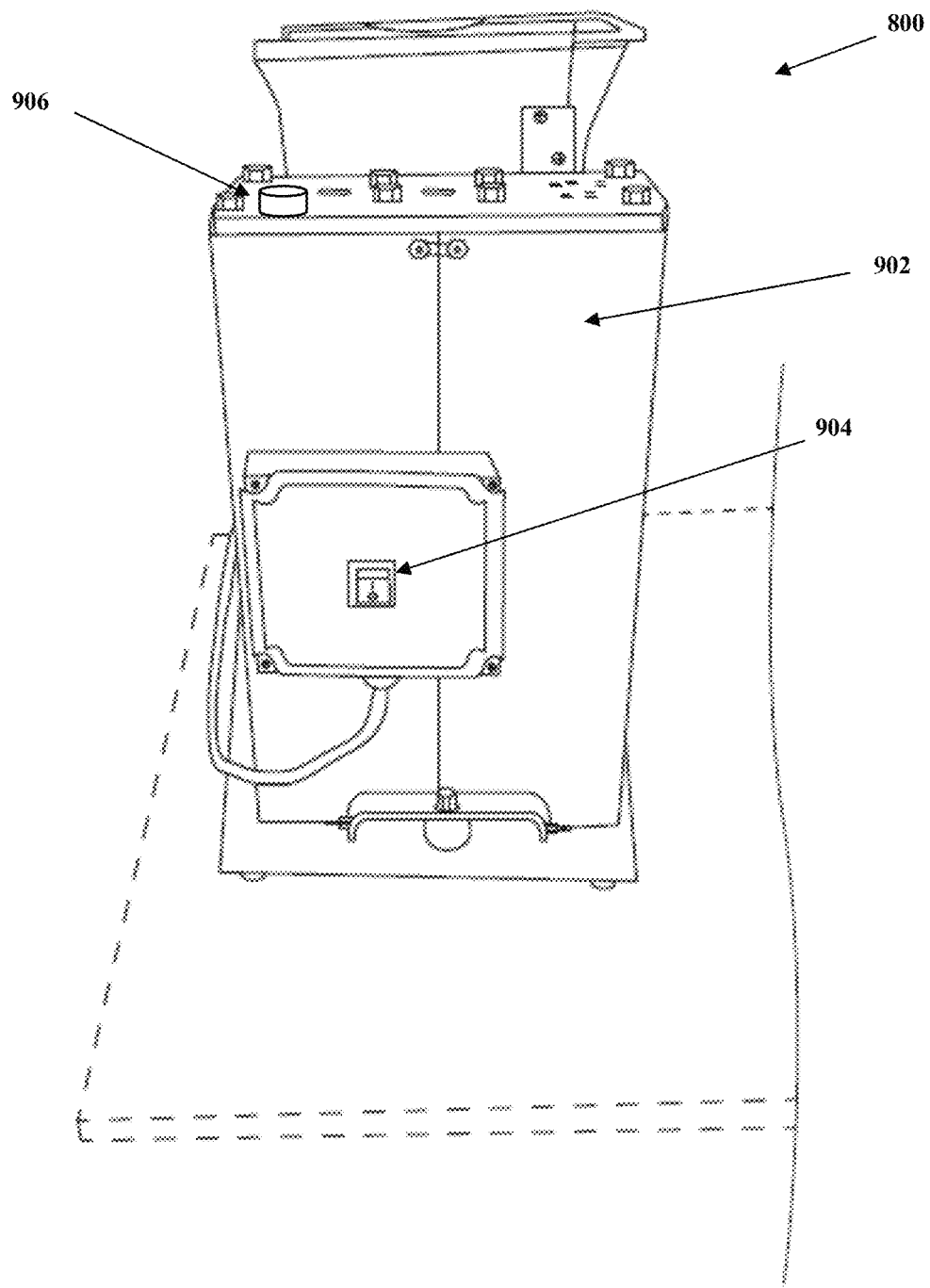
FIG. 9 shows a side isometric view of the hand guard assembly as well as the on/off switch, according to an exemplary embodiment of the invention.
Figure 10:
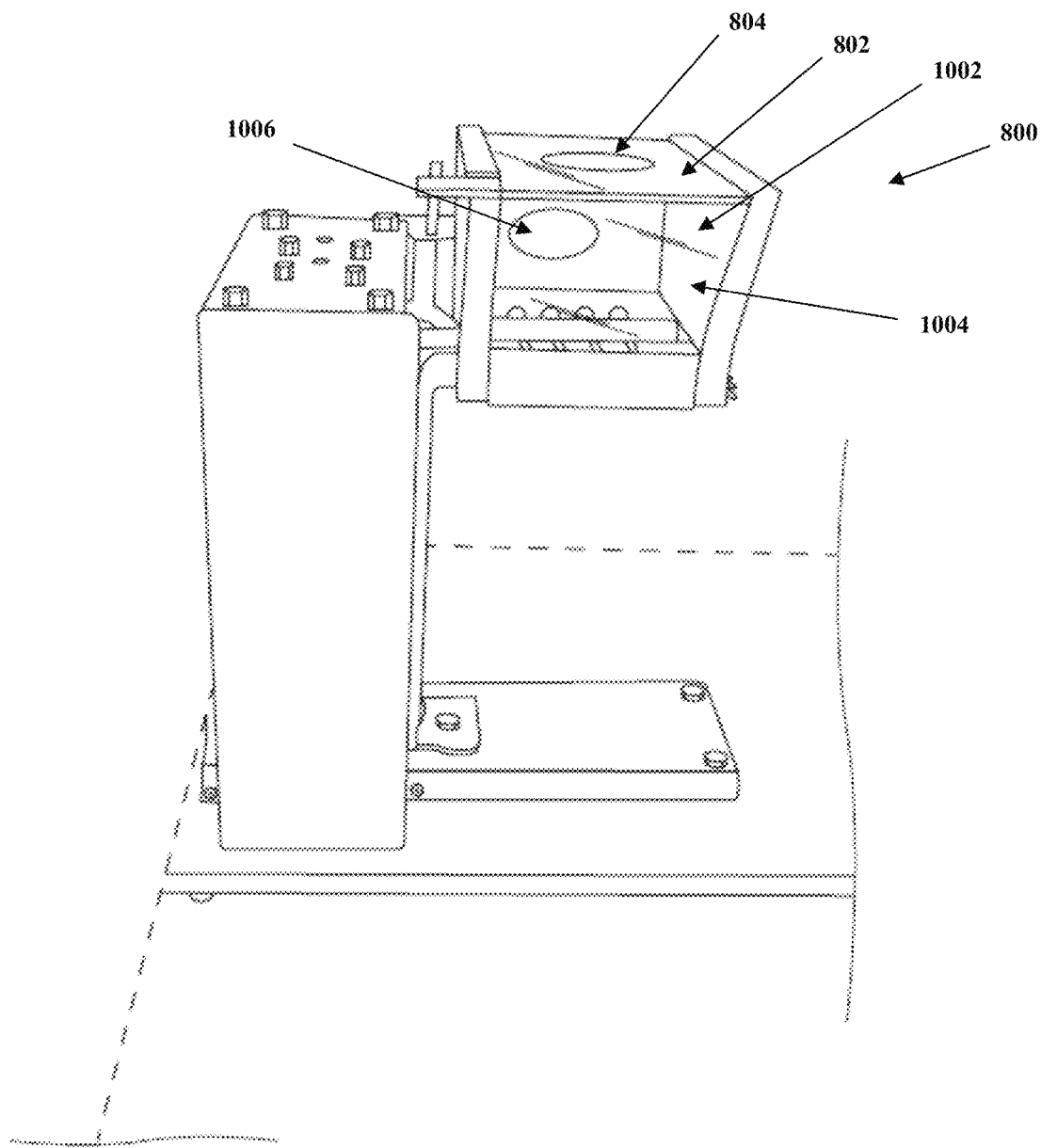
FIG. 10 shows a side isometric view of the hand guard assembly, according to an exemplary embodiment of the invention.
Figure 11:
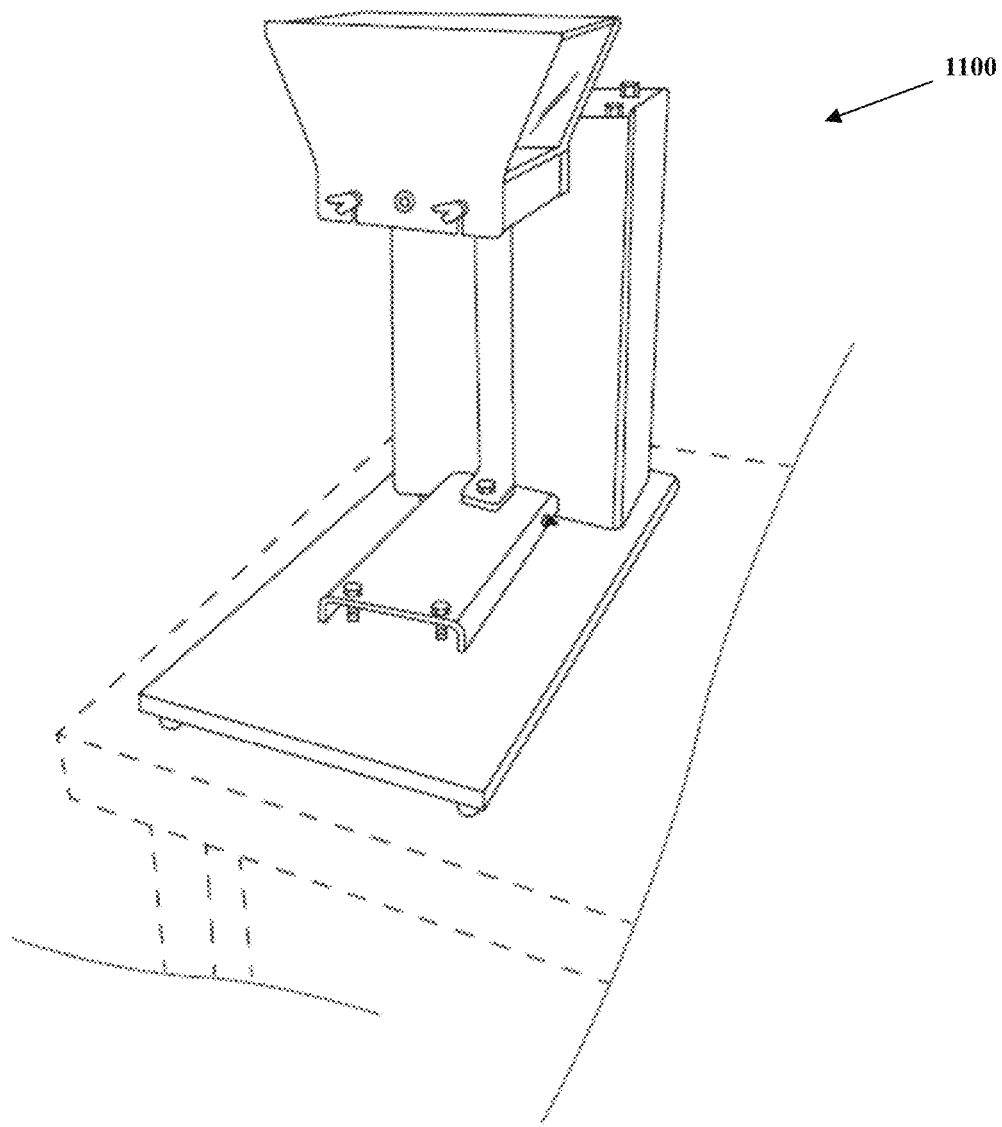
FIG. 11 shows a front isometric view of the hand guard assembly, according to an exemplary embodiment of the invention.

In FIG. 5 we show the manual meat shredder 100 hopper 306 entry, showing the interspersed location of the rotating bars 104 and the fixed bars 106. The adjustable gap between the rotating bars 104 and the fixed bars 106 (selected through the width of the bars 104 and/or 106) provides the degree of shredding of the meat. Shown also is the handle 116, crank 114, chassis support 118 and press 120. FIG. 6 shows the manual meat shredder 100 with the hopper 306 and its entry being attached to the chassis 108 through the studs and wingnuts 308, protecting the shredding action performed by the rotating 104 and fixed 106 bars.

In many instances, there is a need for a powered unit capable of performing the shredding of the meat. Referring to FIGS. 7-11 we show the manual meat shredder 100 bars 104, 106 with the hopper 306 entry, support 118, clamp 120, with the bar carrier 102 rotation accomplished via an electric motor 702 anchored by screws 704. In one embodiment, the motor 702 has reduction gears to generate additional torque.

In one exemplary embodiment of such a unit 800, the hopper forms a funnel that leads the material into the shredding area 706 and has one or more removable protection cover 802 (both along the top and/or sides). This may be attached to the mechanical housing 902 covering the motor 702, and creating a base. In one embodiment this cover 802 may be flipped open, in others it may be snapped, covered, slid to the side or similarly placed in a secure fashion. The ability to remove/flip it may be desired for cleaning and other sanitary reasons.

In one embodiment, one or more of the safety covers are equipped with electrical sensors so that the unit grinding motor 702 may not be engaged without the covers 802 being in the proper position. The cover 802 has an opening 804 through which the meat to be shredded is fed onto the shredder bars 104, 106. It is critical that the opening 804 be significantly smaller than a human hand (to prevent accidental insertion into the shredding area and/or the funnel. Making the diameter from 5 to 8 cm is recommended. Looking at the back view 900, we see the motor housing 902, which may completely replace the handle assembly 114, 116 or be connected to the motor shaft.

The motor On/Off switch 904 may act as an emergency shutoff, or a separate push button 906 unit may be placed within the unit. In one embodiment, this is placed over the motor housing and/or on the side. In this fashion, the operator my reach said emergency stop with their free hand.

When looking at the unit from the side, we see that there may be more than one opening 804. In one embodiment, a second side feeding opening 1006 may be added to one or more of the side panels 1002, 1004. In addition, these may also be transparent, to ensure that the operator can see the amount of material still to be shredded. Finally, the front view 1100 of the unit allows us to appreciate the space available for a container in which to receive the shredded product.

SHREDDER GLOSSARY

100—Manual Meat Shredder View
102—Rotating Bar Carrier
104—Rotating bars
106—Fixed bars on Housing
108—Housing
11—Shaft
112—Slot
114—Rod/Lever
116—Handle
118—Support
120—Clamp
202—Bolts/Studs
302—Tray
304—Meat
306—Shredded Meat
308—Wingnuts
702—Motor
704—Screws
800—Unit
802—Top Opening
804—Side Opening
900—Back View
902—Motor Housing
904—On/Off Switch
906—Emergency Stop
1000—View
1002—Side Panel
1004—Side Panel

CONCLUSION

In concluding the detailed description, it should be noted that it would be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

The invention claimed is:

1. An apparatus for shredding meat consisting of:
a horizontal rotating central cylinder supported at both ends by a mechanical housing, a shaft connected to one end of said central cylinder, said shaft protruding to the exterior of said mechanical housing's exterior, wherein said mechanical housing's interior forms a shredding area having a top and a bottom opening for the meat to go through;
said central cylinder having a plurality of rows of rotating bars affixed along said central cylinder's surface, and said mechanical housing having a plurality of rows of fixed bars affixed along each side of said mechanical housing's interior sides, wherein said fixed bars are interspersed with said rotating bars so when they are located along the same plane a gap exists between said fixed bars and said rotating bars;
wherein said rotating bars and said fixed bars have a circular, triangular or rectangular geometric cross section;
a rotation motor and gears mechanically connected to said shaft;
electrical control components for said motor; and a hopper forming a funnel to match the shredding area top opening, said hopper having a removable safety cover with an opening diameter from 5 to 8 cm, said removable safety cover having a safety cover surface that opens to reach the interior of said hopper, including an electrical sensor coupled to said removable safety cover so that the grinding motor will not engage without said removable safety cover being in the proper position.

2. The apparatus of claim 1 wherein;

said electrical control components include an On/Off switch and an emergency stop button.

3. The apparatus of claim 2 wherein;

the rotating bars and said fixed bars are replaceable.

\* \* \* \* \*